United States Patent [19]

Woodley

[11] Patent Number: 4,497,454
[45] Date of Patent: Feb. 5, 1985

[54] TAPE LOADING MACHINE
[75] Inventor: George M. Woodley, Shrewsbury, Mass.
[73] Assignee: King Instrument Corporation, Westboro, Mass.
[21] Appl. No.: 474,467
[22] Filed: Mar. 11, 1983
[51] Int. Cl.³ ............... B65H 19/20; B65H 19/16; B65H 21/02
[52] U.S. Cl. ................. 242/56 R; 242/58.3; 242/58.4; 156/159
[58] Field of Search ............. 242/55, 56 R, 56.1, 242/56.2, 56.3, 56.4, 56.5, 56.6, 56.7, 56.8, 56.9, 58.1, 58.2, 58.3, 58.4, 58.5, 55.19, 67.1, 67.3, 180, 181; 156/502, 505, 506, 159

[56] References Cited
U.S. PATENT DOCUMENTS

| | | |
|---|---|---|
| 3,737,358 | 6/1973 | King ............................. 156/502 |
| 3,997,123 | 12/1976 | King ............................. 242/56 R |
| 4,332,355 | 6/1982 | Zopfy et al. .................. 242/56 R |
| 4,364,791 | 12/1982 | Kincheloe ...................... 156/506 |
| 4,372,503 | 2/1983 | Kincheloe et al. ............. 242/183 |
| 4,377,251 | 3/1983 | Kincheloe et al. ............. 226/195 |
| 4,436,251 | 3/1984 | Deyesso et al. ............... 242/56 R |

Primary Examiner—Stuart S. Levy
Assistant Examiner—Lloyd D. Doigan
Attorney, Agent, or Firm—Schiller & Pandiscio

[57] ABSTRACT

An improved cassette loading machine is provided which has means for rotatably supporting two supply reels of magnetic tape, means for loading cassettes with tape from either supply reel, and means for automatically (1) terminating the loading of cassettes when the tape supply on a first supply reel is nearly exhausted, (2) splicing the tape from the second supply reel to the tape from the first supply reel, and (3) resuming the loading of cassettes with tape from the second supply reel.

10 Claims, 23 Drawing Figures

TAPE LOADING MACHINE

This invention relates to the art of loading tape into cassettes and more particularly to an improved process and apparatus for loading magnetic tape into C-Zero ("C-O") cassettes. A C-O cassette is a cassette which contains a leader tape but no magnetic tape extending between its two hubs. A number of different machines have been developed for loading blank or pre-recorded magnetic tape into C-O cassettes. One such machine is shown in U.S. Pat. No. 3,997,123 issued Dec. 14, 1976 to James L. King.

Over the last ten years, the emphasis has been on reducing the cycle time of such machines so as to increase the productivity of the machines and to allow one operator to handle a plurality of such machines. The operator's duties include replenishing the supply of use tape (i.e., the magnetic tape to be loaded), placing the leading end of the use tape in position to be trimmed, spliced and wound into a cassette, keeping the storage magazine filled with C-O cassettes, and making sure that loaded cassettes are properly removed from the machine. In recent years automatic cassette loading machines such as shown in U.S. Pat. No. 3,997,123 have been improved to the point where they are capable of loading audio cassettes with sufficient tape to provide a playing time of 60 minutes in about 5-6 seconds. As a result, the supply reel of use tape, generally called a "pancake", is exhausted rapidly, usually in about 2.5 minutes. Depending upon the skill of the operator, if an operator is monitoring the performance of several machines, a machine may exhaust its pancake long before the operator is ready to mount a new full pancake on the machine. When this situation occurs, for maximum productivity the operator is required to rush to reload the machine with a new pancake since the machine will remain idle until the exhausted supply of use tape is replenished.

The primary object of this invention is to improve the yield obtainable from existing automatic cassette loading machines.

A more specific object is to provide a cassette-loading machine which is adapted to automatically shift from a first pancake to a second pancake so that the loading of cassettes may continue with only a brief interruption.

Another object is to provide an improved method of loading C-O cassettes using a cassette loading machine whereby a first pancake of supply tape is automatically replaced by a second pancake of supply tape.

These and other objects are attained according to the present invention by providing and using a machine which comprises (a) first and second shiftable splicing block assemblies, (b) first and second splicer units associated with said first and second splicing block assemblies respectively, (c) first and second rotatable tape reel support means for rotatably supporting first and second pancakes of use tape, (d) means for rotating said tape reel support means on command so as to unwind tape therefrom, (e) first and second cutter means associated with said first and second splicing block assemblies respectively, (f) means for holding a plurality of C-O cassettes to be loaded, (g) means for feeding C-O cassettes one at a time to a loading station and for discharging loaded cassettes from the loading station, (h) means for withdrawing the leader from a cassette located at the loading station and placing it on the first splicing block assembly, (i) means for rotating one of the hubs of a cassette located at the loading station so as to wind tape thereon, and (j) means for operating said aforementioned-means so that (1) successive cassettes are loaded with use tape from the first pancake at the loading station, (2) as the supply of use tape provided by the first pancake is nearly exhausted, the loading of cassettes is interrupted momentarily and during the interruption a leading end of the use tape of the second pancake is automatically spliced to a trailing end of the use tape of the first pancake, and (3) thereafter successive cassettes are loaded with use tape from the second pancake at the loading station.

According to the preferred embodiment of the invention, the first splicing block assembly comprises first and second movable blocks, with the first block comprising first and second tape guide means and the second block comprising third and fourth tape guide means, and the second splicing block assembly comprises third and fourth blocks with the third block being fixed relative to the other three blocks and comprising fifth, sixth and seventh tape guide means, and the fourth block being movable relative to the first, second and third blocks and comprising eighth and ninth tape guide means. The first, second and third blocks are movable so that each of their tracks may be aligned with the center (i.e. the sixth) track of the fixed block. The foregoing objects, arrangement and attendant advantages of the invention are further described in or rendered obvious by the following detailed description of the invention which is to be considered in connection with the accompanying drawings wherein:

Figure 1:
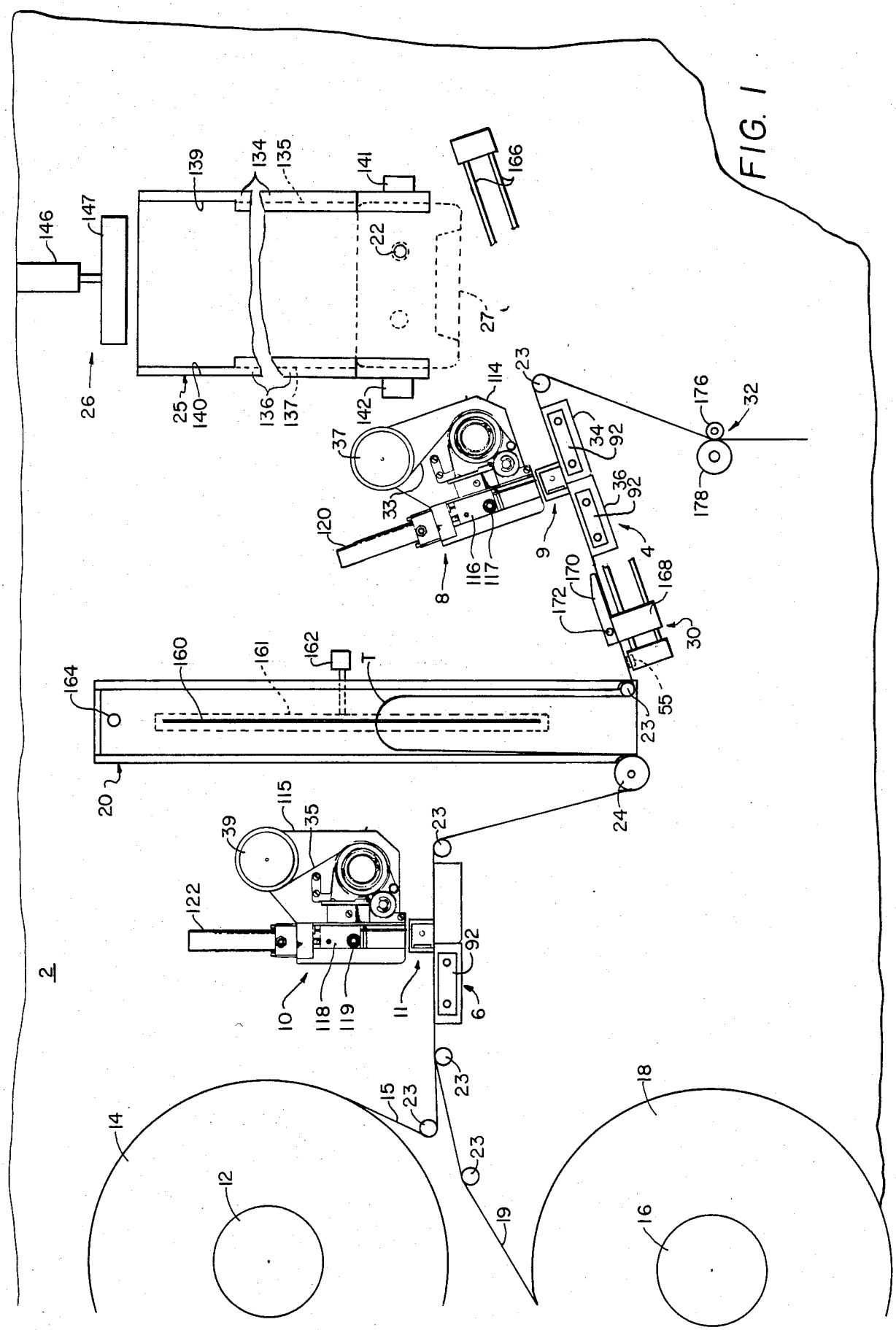
FIG. 1 is a front view in elevation of a machine incorporating the preferred embodiment of the invention.
Figure 4:
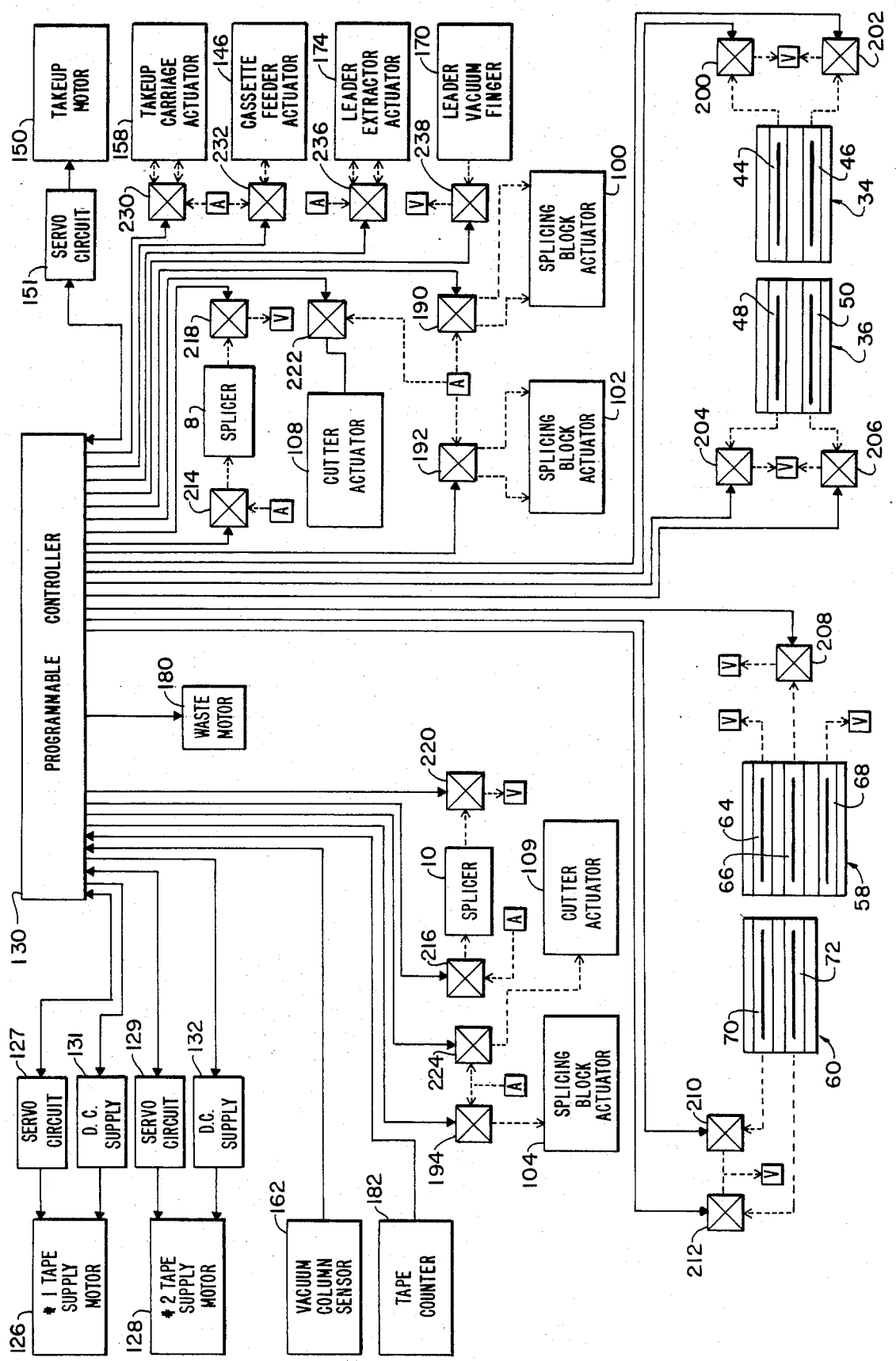
Figure 5:
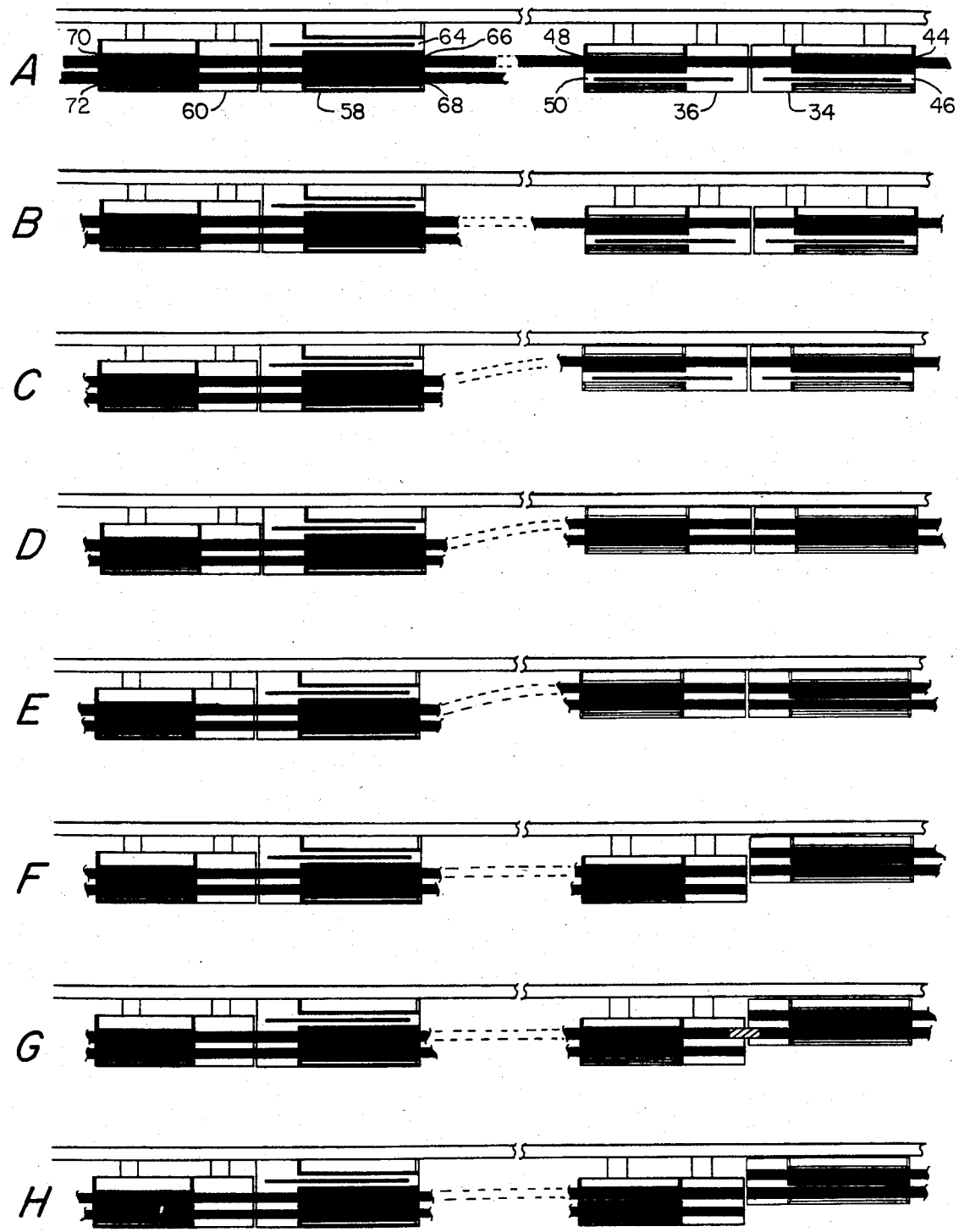
Figure 5:
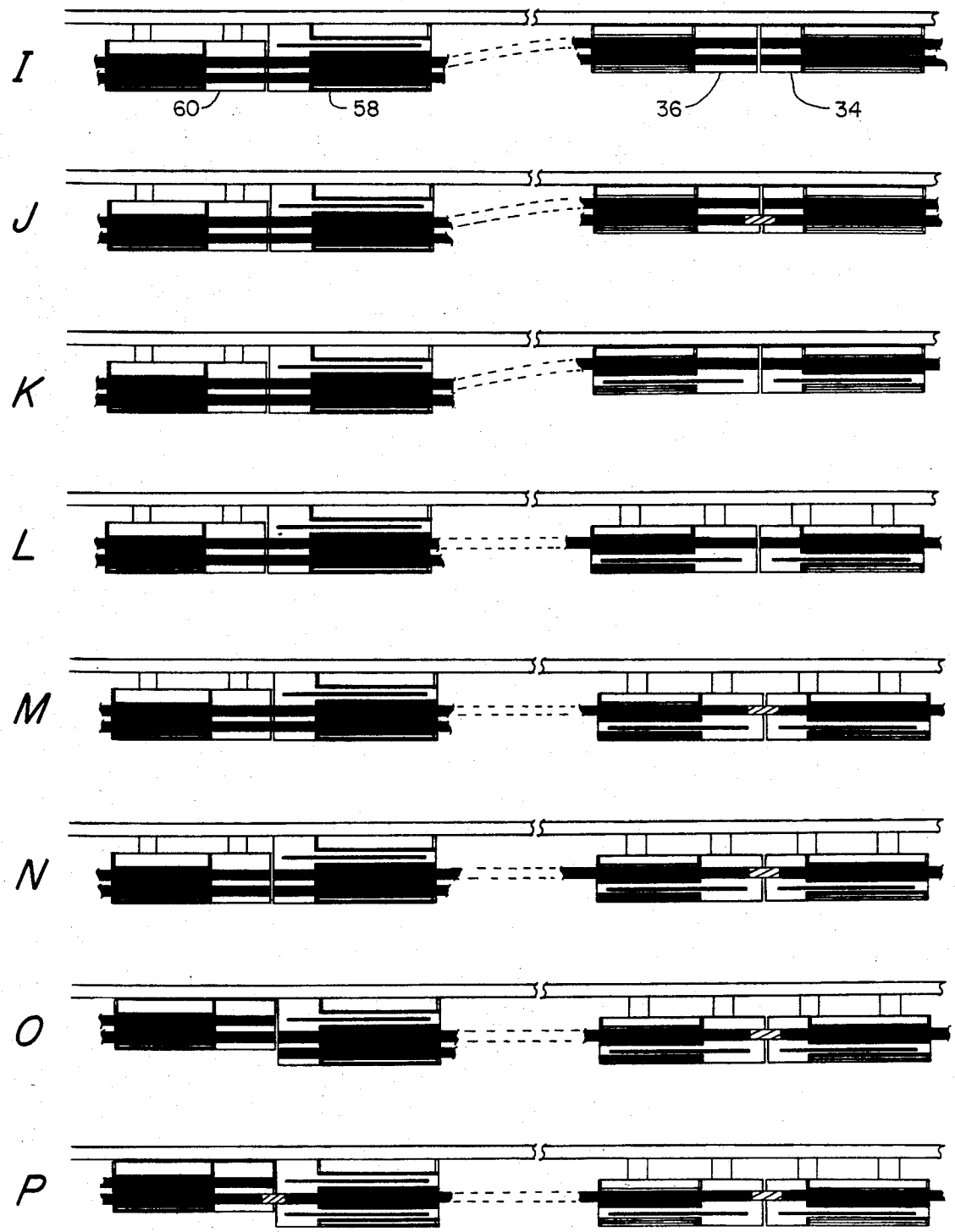
Figure 5:
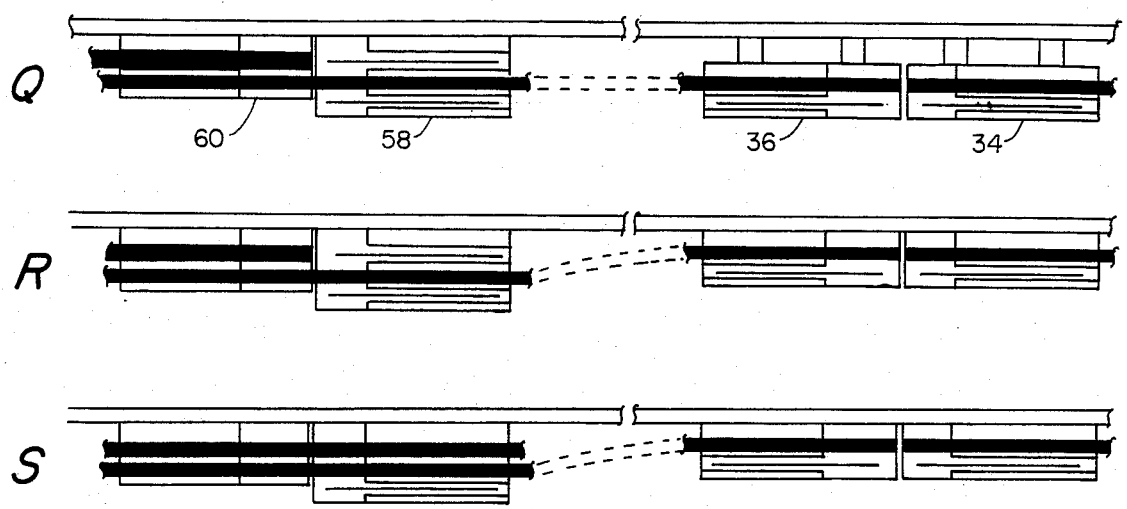

FIG. 4 schematically illustrates the control system for the machine shown in FIG. 1; and FIGS. 5A-5S are enlarged schematic plan views illustrating different positions of the two splicing blocks during a typical operating cycle of the machine.

Turning now to FIG. 1, the illustrated apparatus is a machine for loading C-O cassettes which incorporates the present invention and is an improvement upon the machine disclosed and claimed in said U.S. Pat. No. 3,997,123 of James L. King. The illustrated apparatus also is similar in certain respects or includes features that are generally the same or similar to features of the devices illustrated and described in U.S. Pat. Nos. 3,737,358 issued Nov. 12, 1973 to James L. King, 4,364,791 issued Dec. 21, 1982 to David W. Kincheloe, and 4,372,503 issued Feb. 8, 1983 to David W. Kincheloe et al, and also U.S. patent application Ser. No. 195,345 filed Oct. 8, 1980 by David W. Kincheloe et al, now U.S. Pat. No. 4,377,251.

More particularly the illustrated machine comprises a front panel 2 which carries a first splicing block assembly 4, a second splicing block assembly 6, a first splicer unit 8, a second splicer unit 10, first and second tape cutting mechanisms 9 and 11 associated with splicing block assemblies 4 and 6 respectively, a first supply hub 12 carrying a first pancake 14 of tape 15, a second supply hub 16 carrying a second pancake 18 of tape 19, a takeup vacuum column 20, a takeup spindle 22, guide rolls 23, a counter wheel 24, a magazine 25 for holding a supply of C-O cassettes to be loaded, means 26 for feeding a cassette 27 to be loaded to a predetermined loading station and for causing loaded cassettes to be discharged from the loading station, a leader extractor means 30 for removing a leader from a cassette disposed in said loading position and positioning the extracted leader in a suitable position on splicing block assembly 4 in the manner hereinafter described, and a waste tape transporter mechanism 32.

Figure 2:
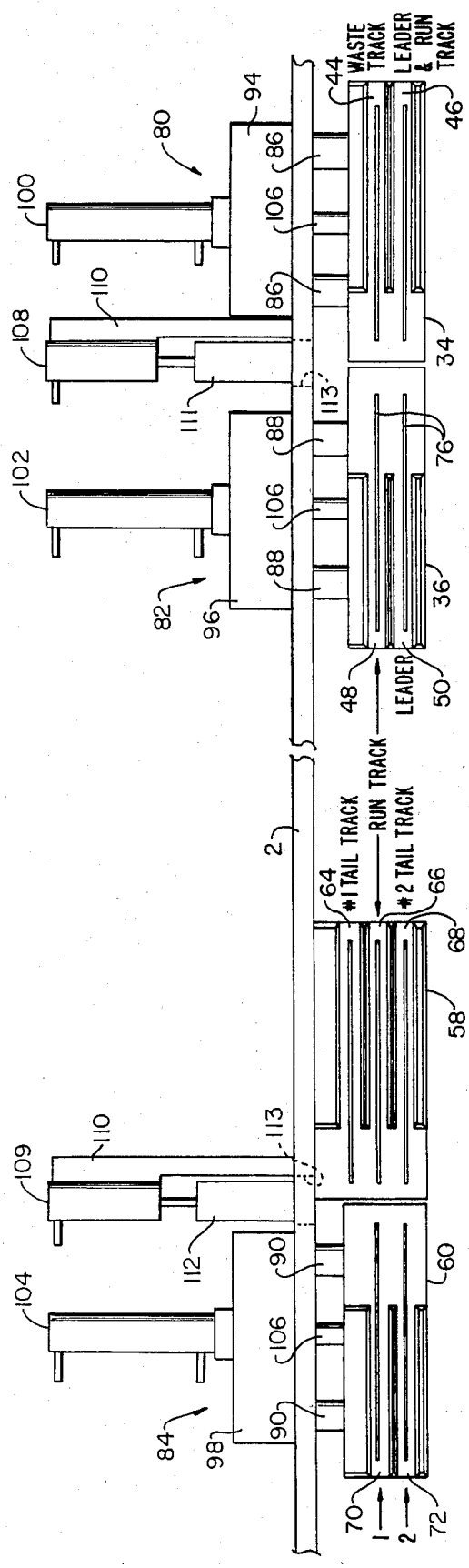
FIG. 2 is a plan view illustrating the upper surfaces of the two splicing block assemblies and including schematic representations of other members of the machine which are associated with the two splicing block assemblies.

Referring now to FIGS. 1 and 2, splicing block assembly 4 comprises first and second splicing blocks 34 and 36 respectively which are supported as hereinafter described so that they may be reciprocated toward and away from the front side of front panel 2 on command. A narrow gap exists between the two blocks to accommodate a tape cutter blade carried by a tape cutter hereinafter described. Splicing block 34 has two tape guide tracks 44 and 46 respectively in its upper surface. Splicing block 36 has two tape guide tracks 48 and 50 respectively in its upper surface.

Splicing block assembly 6 comprises third and fourth splicing blocks 58 and 60 respectively. Splicing block 58 is fixed to the front panel 2. Splicing block 60 is movably supported as hereinafter described so that it may be reciprocated toward and away from the front side of front panel 2. A narrow gap exists between blocks 58 and 60 to accommodate a tape cutter blade carried by a tape cutter hereinafter described. Splicing block 58 has three guide tracks 64, 66 and 68 respectively, while splicing block 60 has two guide tracks 70 and 72 respectively.

The guide tracks of the two splicing block assemblies are identical in width and depth. Also the tracks on each splicing block are spaced from one another the same as are the tracks of the other three blocks. Each splicing block has suction apertures, preferably long razor slit-like apertures 76, in the base of each of its tape guide tracks. Additionally each block is provided with internal passageways (not shown), one for each track, which communicate with apertures 76 and have ports adapted to be connected by flexible hose lines to a source of vacuum via electrically controlled solenoid valves as hereinafter described. The arrangement of the internal passageways and the flexible hose lines which connect them to the vacuum source is not shown since such arrangements are well known, may be varied extensively without any adverse effect on the present invention, and are disclosed, for example, in U.S. Pat. Nos. 3,737,358 and 3,997,123.

To facilitate understanding of the present invention, the various tracks are identified as follows: track 44 is the "waste" track, track 46 is the "leader and run" track, track 48 is the "run" track, track 50 is the "leader" track, track 64 is the "#1 tail" track, track 66 is the "run" track, track 68 is the "#2 tail" track, track 70 is the "#1 tape supply" track, and track 72 is the "#2 tape supply" track.

Referring to FIG. 2, splicing blocks 34, 36 and 60 are supported and are moved toward and away from front panel 2 by identical block-shifting mechanisms 80, 82 and 84. Such mechanisms are well known, and may take various forms, e.g., they may be made according to the construction disclosed in U.S. Pat. Nos. 3,737,358 and 3,997,123. The essential thing is that each such mechanism must be capable of operating on command to move its associated splicing block toward or away from panel 2 a distance equal to the spacing between two adjacent tape guide tracks.

Preferably the block shifting mechanisms 80, 82 and 84 are made so that they comprise pairs of support rods as shown at 86, 88 and 90 which are perpendicular and fixed to panel 2, the splicing blocks 34, 36 and 60 are slidably mounted on rods 86, 88 and 90 respectively, the front ends of the rods are connected by stop members 92 which limit forward movement of the blocks, and rearward movement of the blocks preferably is limited by engagement with panel 2. Preferably the mechanisms 80, 82 and 84 comprise support blocks 94, 96 and 98 which are affixed to the rear side of front panel 2, and mounted to support blocks 94, 96 and 98 are double acting pneumatic actuators 100, 102 and 104 respectively. The piston rods 106 of actuators 100, 102 and 104 slidably extend through oversized openings in front panel 2 and are attached to splicing blocks 34, 36 and 60 respectively. Consequently (a) if high pressure air is admitted to the rear ends of actuators 100, 102 and 104, splicing blocks 34, 36 and 60 will be moved forward against stop members 92, and (b) if high pressure air is admitted to the front ends of actuators 100, 102 and 104, the same splicing blocks will be moved rearward up against front panel 2.

Tape cutting mechanisms 9 and 11 comprise single acting pneumatic actuators 108 and 109 attached by members 110 to the rear side of panel 2, and cuttercarrying arms 111 and 112 attached to the ends of the piston rods of actuators 108 and 109 and mounted for reciprocating movement through suitable apertures 113 in front panel 2. Apertures 113 are located so that the cutter blade carried by arm 111 can pass between splicing blocks 34 and 36 and the cutter blade carried by arm 112 can pass between splicing blocks 58 and 60, so as to cut tape extending across the gaps between the blocks. Further details of the tape cutting mechanism are not required to be disclosed since such means are well known as shown by U.S. Pat. Nos. 3,737,358 and 3,997,123.

Tape splicers are well known and splicers 8 and 10 may take various forms for the purpose of this invention. Thus, for example, they may be constructed generally in the manner described and illustrated in U.S. Pat. Nos. 3,737,358 and 4,364,791. Thus, in this case the splicers 8 and 10 preferably comprise base plates 114 and 115 which are fixed to front panel 2, and plungers 116 and 118 which are reciprocated by operaton of single-acting pneumatic actuators 120 and 122 respectively operating through solenoid-operated valves hereinafter disclosed. The splicers also include means (not shown) for feeding adhesive coated splicing tape 33 and 35 from supply reels 37 and 39 into the path of plungers 116 and 118, and cutter means (not shown) attached to plungers 116 and 118 for cutting off a length of splicing tape 33 or 35 extending across the region below plungers 116 and 118. Plungers 116 and 118 also include vacuum ports 117 and 119 which are adapted to be connected via hoses(not shown) and suitable solenoid operated valves hereinafter described to a source of vacuum (not shown). The ports 117 and 119 communicate with small apertures (not shown) in the bottom end of the plungers so that the cut sections of splicing tape may be held to the bottom end of the plungers by vacuum as the plungers are moved downwardly by operation of actuators 120 and 122 toward splicing block assemblies 4 and 6 respectively. The plungers 116 and 118 have a stroke long enough to transport splicing tape down into engagement with the two splicing block assemblies. The splicer 8 is positioned and adapted so that plunger 116 can apply a piece of adhesive splicing tape to the abutting ends of two tapes to be joined positioned on splicing blocks 34 and 36. Splicer 10 is positioned so that its plunger 118 can similarly apply a piece of splicing tape to the abutting ends of two tapes positioned on splicing blocks 58 and 60.

The use tapes 15 and 19 of pancakes 14 and 18 may be blank tape or pre-recorded tape. Hubs 12 and 16 are connected to and driven by separate servo drive motors 126 and 128 (FIG. 4). Although not shown, it is to be understood that these motors are mounted to the rear side of front panel 2. As shown in FIG. 4, motors 126 and 128 are connected via conventional servo-control circuits 127 and 129 to a programmable controller 130 hereinafter described. Motors 126 and 128 are reversible for the purpose hereinafter made obvious.

As noted earlier, magazine 25 holds a plurality of C-O cassettes to be loaded and may take various forms without adversely affecting the present invention. Thus, the magazine may be similar to the one shown in U.S. Pat. No. 3,997,123. In the illustrated embodiment of the present invention, the magazine 25 comprises a pair of side members 134 and 136 which have guide channels 135 and 137 respectively for receiving opposite side edges of the cassettes to be loaded and notches 139 and 140 whereby cassettes may be admitted to the magazine for insertion into guide channels 135 and 137. The magazine also includes a pair of cassette retainers 141 and 142 associated with side members 134 and 136 which coact to yieldably hold a C-O cassette 27 in loading position. Retainers 141 and 142 may take various forms, e.g., they may be spring-biased members which yieldably grip a cassette so as to hold it in loading position. Associated with magazine 25 is the cassette feeder mechanism 26 which is employed to force cassettes downward in the magazine to the predetermined loading position. Preferably the cassette feeder 26 comprises a single-acting pneumatic actuator 146 (FIGS. 1 and 4) which has a pusher member 147 (FIG. 1) attached to its piston rod for engaging a C-O cassette positioned in the magazine and pushing that cassette into loading position.

Figure 3:
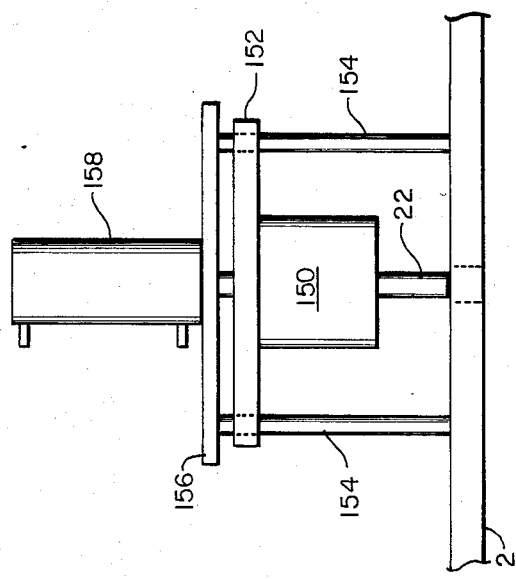
FIG. 3 is a schematic and fragmentary plan view showing the takeup motor assembly.

Takeup spindle 22 is used to wind tape into a cassette held in loading position. As seen in FIG. 3, spindle 22 is connected to and driven by a reversible servo motor 150 which is attached to a carriage 152. The latter is mounted for sliding reciprocal movement on a plurality of slide rods 154 which are secured to and extend between panel 2 and a rear plate 156. Attached to plate 156 is a double-acting pneumatic actuator 158, the piston rod of which extends through an oversized hole in plate 156 and is attached to carriage 152. Pneumatic actuator 158 is adapted to move carriage 152 between a first retracted position wherein spindle 22 is withdrawn from front panel 2 and a second extended position wherein spindle 22 extends through an opening in front panel 2 in position to engage and drive one of the hubs of a cassette 27 located in loading position. As seen in FIG. 4, motor 150 is connected to the controller 130 so as to be operated by the controller at the proper time and for the proper time duration during the operating cycle of the machine.

Referring to FIG. 1, vacuum column 20 is located between a guide roll 23, which is located proximate to splicing block 58, and splicing block assembly 4. The top end of the column is closed, while its bottom end is open to accommodate a loop T of tape being transported from one of the pancakes to splicing block assembly 4. The rear wall of the vacuum column has a narrow slit 160 which communicates with a chamber 161 on the rear side of the rear wall having a port connected to a pressure transducer 162. The rear wall of the column also has an aperture 164 near its top end for connecting the interior of the column to the source of vacuum previously described. The output of pressure transducer 162 is an electrical signal which is passed to the controller 130 (FIG. 4) so that the latter may adjust the speed of servomotor 126 or 128 (depending upon which is in operation) in accordance with the size of the use tape loop T in column 20. A description of further details of the vacuum column is not believed to be necessary since such columns and the manner in which they are used is well known, as shown by said U.S. Pat. No. 4,372,503 and U.S. patent application Ser. No. 195,345.

Leader extractors are already well known in the art and may take various forms. The essential thing is that the leader extractor mechanism 30 must be capable of operating on command so as to (a) pull out the leader of a cassette 27 stationed in loading position, (b) place the leader in two aligned tracks of splicing blocks 34 and 36, and (c) release the leader after it is properly positioned on splicing blocks 34 and 36.

Preferably leader extractor 30 is constructed generally in the manner described in U.S. Pat. No. 3,997,123, but may be made and operated as disclosed in U.S. Pat. No. 4,328,065. In the preferred case leader extractor means 30 comprises a pair of parallel rails 166 mounted to the front side of panel 2 so as to be parallel to but spaced forwardly away from the panel. Mounted for slidable movement on rails 166 is a leader extractor carriage 168 having a hollow finger 170 which is open at its forward end and has a port provided with a hose fitting 172 whereby it may be connected to a source of vacuum via a solenoid operated valve hereinafter described. Carriage 168 is reciprocated by a suitable reciprocating mechanism which is not shown in detail since it may take various forms, e.g., it may be made in accordance with the teachings of U.S. Pat. No. 3,997,123. For the purposes of this invention the carriage reciprocating mechanism includes a double-acting pneumatic actuator 174 (FIG. 4) similar to splicing block actuators 100, 102 and 104. Although not shown in detail, it is to be understood that carriage 168 and finger 170 are constructed so that finger 170 projects sideways from carriage 168 toward front panel 2 in position to extend directly over and travel lengthwise of tracks 46 and 50 when splicing blocks 34 and 36 are both in their retracted positions up against panel 2 in the manner shown in FIG. 5D.

Waste tape transporter mechanism 32 comprises a drive roller 176 and a pinch roller 178 mounted to front panel 2. Drive roller 176 is driven by a waste tape motor 180 (FIG. 4) which is attached to the rear side of front panel 2.

FIG. 4 shows a preferred form of control system for a machine embodying the present invention. The illustrated control system preferably includes a microprocessor-type controller 130 which is capable of being programmed in a suitable computer programming language so as to function in the manner hereinafter described. The controller is connected so as to transmit and receive signals to and from the servocontrol circuits 127, 129 and 151 of supply servomotors 126 and 128 and takeup servomotor 150 respectively, and also to transmit control signals to the drive circuit of waste tape motor 180. The control system also includes two d.c. power supplies 131 and 132 which are connected to motors 126 and 128 respectively. Power supplies 131 and 132 are connected to controller 130 so that they may be switched on and off by the controller in the manner hereinafter described during the operating sequence of the machine. Power supplies 131 and 132 are connected so that when energized they will urge motors 126 and 128 in the direction required to rewind use tapes 15 and 19 on pancakes 14 and 18. The controller also is connected to receive an input signal from a resettable electronic counter 182 which is coupled to counter wheel 24 and is adapted to provide a signal varying in accordance with the number of revolutions of counter wheel 24. The form of counter 182 and how it is coupled to counter wheel 24 may be varied in ways well known in the art, as, for example, as disclosed in U.S. Pat. No. 3,997,123. The system of FIG. 4 also is adapted to determine when the pancake 14 or 16 is close to being fully depleted. Thus, if a full pancake of blank tape contains more tape than is required to load 25 cassettes but not enough to load 26 cassettes with a predetermined amount of tape, the controller is programmed so that it will count the number of cassettes that are loaded with tape from one pancake and to stop the loading operation after 25 cassettes have been loaded.

Controller 130 also is connected to receive an output signal from the vacuum column sensor 162 which provides a measure of the height of the tape loop T in column 20 and serves as a control signal that causes the controller to vary the speed of servomotors 126 and 128 so as to maintain a constant tension on the tape being wound into a cassette. Preferably but not necessarily, controller 130 is programmed so that during winding servomotor 150 will run according to a predetermined velocity/time curve and servomotors 126 and 128 will operate responsively to the signal from sensor 162 so as to maintain a constant tension on use tape 15 or 19, in substantially the same manner as the tape winding system described in U.S. patent application Ser. No. 290,417 of Joseph P. Deyesso et al filed Aug. 6, 1981, now U.S. Pat. No. 4,436,241. It is to be noted as an alternative measure the control system may be constructed and controller 130 may be programmed so as to operate servomotor 150 and servomotor 126 or 128 during the cassette loading part of the operating cycle in accordance with the system disclosed by said U.S. Pat. No. 4,372,503 of David W. Kincheloe et al. The controller 130 also is connected so as to operate cassette feeder 26 at proper times in the operating cycle of the machine.

The system of FIG. 4 also includes a plurality of solenoid operated air valves hereinafter described for controlling operation of the various actuators. A plurality of electrical control lines couple electrical control signals between controller 130 and the energizing relay circuits for the solenoids of the various solenoid valves hereinafter described. For convenience of illustration, the energizing relay circuits for the solenoid valves are omitted from FIG. 4 and instead the connecting circuits are represented as simple control lines connecting the valves and the controller.

The control system includes suitable sources of high pressure air and vacuum which are adapted to be coupled via the air valves to the various actuator components already described. For simplicity of illustration, the air and vacuum sources are represented as A and V in FIG. 4. More particularly, the system includes three four-way solenoid valves 190, 192 and 194 connected so as to control operation of actuators 100, 102 and 104 respectively. Valves 190, 192 and 194 each have one port connected to the source of high pressure air A, a second port connected to the atmosphere, and third and fourth ports connected to the opposite ends of the associated double-acting actuators 100, 102 and 104, whereby the actuators may be operated so as to shift splicing blocks 34, 36 and 60 from a first outer position wherein tracks 44 and 46, 48 and 50, and 70 and 72 are aligned with tracks 66 and 68 respectively of splicing block 58 and a second inner position wherein tracks 44 and 46, 48 and 50, and 70 and 72 are aligned with tracks 64 and 66 of splicing block 58.

The system also has four 3-way valves 200, 202, 204 and 206 associated with splicing block assembly 4. These valves have first ports connected to the vacuum source V, second ports connected to the atmosphere, and third ports connected to the apertures 76 in splicing block tracks 44, 46, 48 and 50. The system also includes three 3-way valves 208, 210 and 212 associated with splicing block assembly 6. Valves 208, 210 and 212 have first ports connected to the vacuum source V, second ports connected to the atmosphere, and third ports connected to the apertures 76 in splicing block tracks 66, 70 and 72. The apertures 76 in tracks 64 and 68 are connected directly to vacuum source V.

The system of FIG. 4 also includes four 3-way valves 214, 216, 218 and 220 associated with splicers 8 and 10. Valves 214 and 216 have one port connected to the source A of pressurized air, a second port connected to the atmosphere and third ports connected to actuators 120 and 122 of splicers 8 and 10, while valves 218 and 220 have a first port connected to the source of vacuum V, a second port connected to the atmosphere, and third ports connected to the vacuum ports 117 and 119 of plungers 116 and 118 respectively of splicers 8 and 10. The system also includes two solenoid valves 222 and 224 which are used to operate cutter arms 111 and 112 respectively. Valves 222 and 224 are both three-way valves, having first ports connected to the high pressure air source A, second ports connected to the atmosphere, and third ports connected to cutter actuators 108 and 109 respectively.

The system of FIG. 4 includes two solenoid valves 230 and 232 associated respectively with takeup carriage actuator 158 and cassette feeder actuator 146. Valve 230 is a 4-way unit, having one port connected to the high pressure air source A, a second port connected to the atmosphere, and third and fourth ports connected to the opposite end ports of double-acting actuator 158. Valve 232 may be a 3-way or 4-way valve depending upon whether the pneumatic actuator 146 of the cassette feeder is of the single or double acting type.

Two additional valves 236 and 238 are employed. Valve 236 is a 4-way valve having one port connected to air source A, a second port connected to the atmosphere and third and fourth ports connected to the opposite end ports of actuator 174. Valve 238 is a 3-way valve, having one port connected to vacuum source V, a second port leading to the atmosphere, and a third port connected to leader vacuum finger 170.

Following is a description of the mode of operation of the machine as it executes one complete operating cycle. For the purposes of this description, assume that the two splicing block assemblies 4 and 6 are in the positions shown in FIG. 5A, and vacuum is being applied to all of the tape guide tracks of splicing blocks 34, 36, 58 and 60 except tracks 46, 50, 66 and 70, and splicer plungers 116 and 118 are in the retracted or elevated positions shown in FIG. 1. Assume also that (a) the leading end of tape 15 has been placed in #1 supply track 70, run tracks 66 and 48, and waste track 44 so that its free end hangs down from block 34 and extends between and is gripped by waste rollers 176 and 178; and (b) the leading end of tape 19 has been placed in #2 supply track 72 and #2 tail track 68 so that its free end hangs down free from block 58 (FIG. 5A). Assume further that waste motor 180 is off, a C-O cassette 27 has been delivered to loading position by cassette feeder 26, takeup motor carriage 152 is in its retracted position, two full supply reels 14 and 18 of blank tape (each supply reel comprises more than enough magnetic tape for producing 25 sixty minute cassettes but not enough to produce 26 cassettes) are mounted on hubs 12 and 16 respectively, servo motor 126 is activated, and power supply 132 is applying a d.c. bias to servo motor 128 so as to urge it counterclockwise just enough to keep tape 19 under tension but not enough to pull it off of splicing blocks 58 and 60. Also, the controller 130 is programmed to determine when 25 cassettes have been loaded from a given pancake 14 or 18.

Assume now that the operator initiates operation of the machine. When this occurs, controller 130 causes a sequence of operations which is described as follows with reference to FIG. 5:

(1) controller 130 causes solenoid valve 222 to operate so as to cause actuator 108 to move cutter arm o 111 forward and then backward to cut the #1 supply tape extending across between blocks 34 and 36 (FIG. 5B);

(2) valves 190 and 192 are now actuated so as to cause actuators 100 and 102 to retract splicing blocks 34 and 36 to the position shown in FIG. 5C;

(3) controller 130 causes valve 230 to be actuated so as to cause actuator 158 to advance carriage 152 forward whereby spindle 22 will engage the right hand hub (as viewed in FIG. 1) of the cassette 27;

(4) controller 130 causes servo circuits 151 to operate takeup motor 150 briefly at a slow speed so as to cause all of the leader tape in the cassette to be wound on that right hand hub;

(5) controller 130 causes motor 150 to stop and then actuates valve 230 so as to cause actuator 158 to retract the carriage 152 and thereby disengage spindle 22 from cassette 27;

(6) valve 238 is actuated by controller 130 so as to cause vacuum to be applied to leader extractor finger 170 and simultaneously valve 236 is actuated to cause the leader extractor mechanism 30 to transport the leader extractor carriage 168 close to the cassette 27 located in loading position, whereby the leader of the cassette is sucked out into finger 170;

(7) valve 236 is operated now so as to cause the leader extractor carriage to return back over splicing block assembly 4 to the position shown in FIG. 1 so as to place the leader L in tracks 46 and 50; at this time, vacuum is applied to tracks 46 and 50 so as to secure the leader therein, as shown in FIG. 5D;

(8) then valve 238 is operated so as to terminate the vacuum connection to finger 170, whereby the leader is released from the finger and held to tracks 46 and 50 by the suction created via the apertures 76 of those tracks;

(9) solenoid valve 222 is operated to cause cutter actuator 108 to move cutter arm 111 to reciprocate to cut the leader tape extending across between blocks 34 and 36 (FIG. 5E);

(10) actuator 102 is operated to move splicing block 36 forward away from panel 2 (FIG. 5F);

(11) valve 218 is operated so that vacuum is applied to plunger 116 of splicer 8, and valve 214 is then operated by the controller so as to cause actuator 120 to move plunger 116 down against splicing blocks 34 and 36;

(12) valve 218 is operated so as to interrupt the vacuum connection to plunger 116 just as or shortly after the plunger reaches blocks 34 and 36, whereby the cut piece of adhesive splicing tape 33 on the bottom end of the plunger of splicer 8 is pressed into contact with the leader in track 46 and the free end of the #1 use tape 15 in track 48 so that the leader and use tapes are spliced together as shown in FIG. 5G;

(13) valve 214 is operated by controller 130 so as to cause actuator 120 to return plunger 116 to its original raised position;

(14) during the period between operations (9)–(13) valve 230 is operated so as to cause actuator 158 to move takeup motor carriage 152 forward whereby takeup spindle 22 will drivingly engage the right hand hub of the C-O cassette 27 which is to be loaded;

(15) valves 202 and 204 are operated simultaneously by the controller so as to release vacuum from tracks 46 and 48, respectively;

(16) controller 130 energizes servo-motors 126 and 150 so that tape will be unwound from pancake 14 and wound into the cassette 27;

(17) the controller determines from the output from counter 182 when a predetermined amount of tape has been wound into the cassette and then signals servo-motors 126 and 150 to stop;

(18) controller 130 causes vacuum to be reapplied via valves 202 and 204 to tracks 46 and 48 respectively;

(19) valve 222 is operated so as to cause actuator 108 to reciprocate cutter arm 111 and thereby sever the #1 supply tape extending between splicer blocks 34 and 36 (FIG. 5H);

(20) actuator 102 retracts splicer block 36 so as to place the leader in track 50 in alignment with the trailing end of the use tape in track 46 (FIG. 5I);

(21) valves 214 and 218 are operated as described in operations (11) to (13) above so that splicer 8 will apply a piece of splicing tape to splice together the abutting ends of the second leader in track 50 and the trailing end of the use tape in track 46 (FIG. 5J);

(22) the vacuum connections to tracks 46 and 50 are terminated and takeup motor 150 is turned on again just long enough to wind the second leader into the cassette (FIG. 5K);

(23) after motor 150 has stopped again, valve 230 is operated so as to cause carriage actuator 158 to retract carriage 152 and disengage takeup spindle 22 from cassette 27;

(24) cassette feeder actuator 146 is operated to cause member 147 to feed a new C-O cassette into loading position and thereby shove the loaded cassette down so that it is discharged from the machine;

(25) operations (3)–(24) are repeated so that successive cassettes are loaded automatically as previously described;

(26) when the controller senses that 25 cassettes have been loaded so that pancake 16 is nearly exhausted, the machine stops its cycle of the foregoing operations after it has completed operation (23);

(27) splicing blocks 34 and 36 are now moved forward away from panel 2 to the position shown in FIG. 5L;

(28) splicer 8 is operated again to splice together the trailing end of the tape in waste track 44 and the leading end of the use tape in run track 48 (FIG. 5M);

(29) controller 130 causes valves 208 and 210 to apply vacuum to tracks 66 and 70, and then valve 224 is operated so as to cause actuator 109 to reciprocate cutter arm 112 to sever the use tapes 15 and 19 extending across between blocks 58 and 60 (FIG. 5N);

(30) supply motor 126 is disconnected from servo circuit 127 and connected to d.c. supply 131; nearly simultaneously supply motor 128 is disconnected from d.c. supply 132 and connected to servo circuit 129;

(31) then valve 194 is then operated so as to cause actuator 104 to retract splicing block 60 against panel 2 (FIG. 5O);

(32) valves 216 and 220 are now operated in the manner described above for valves 214 and 218 so as to cause splicer 10 to splice together the leading end of the #2 use tape in track 72 and the trailing end of the waste use tape in track 66; thereafter, the vacuum established in tracks 44, 48, 66 and 72 is turned off (FIG. 5P);

(33) waste tape motor 180 is energized just long enough for the waste tape in tracks 44, 48, 66 and 72 to be pulled far enough for the splice made by splicer 10 to move past the gap between splicing blocks 34 and 36, preferably beyond the end of block 34;

(34) then the vacuum is reapplied to tracks 44 and 48, and controller 130 causes valve 222 to reciprocate cutter 108 so as to cut the #2 supply tape 19 between splicer blocks 34 and 36 (FIG. 5Q);

(35) actuators 100 and 102 then shift blocks 34 and 36 inwardly against panel 2 as shown in FIG. 5R;

(36) the controller than causes operations (3)–(24) to be conducted repetitively to use up the tape of pancake 18 (during the period that the #2 pancake 16 is being used, the operator replaces the exhausted pancake 14 with a new pancake and places the leading end of its tape 15 in tracks 70 and 64 so that it dangles down free from block 58 in the manner previously described, as shown in FIG. 5S);

(37) when the second pancake 18 has been nearly exhausted, the loading of cassettes is terminated as follows: when the controller senses that 25 cassettes have been loaded so that pancake 18 is nearly exhausted, the machine stops its cycle of the foregoing operations after it has completed operation (23), and blocks 34 and 36 are moved out so that tracks 44 and 48 are again aligned with track 66;

(38) splicer 8 is then operated to splice together the leading end of the #2 use tape 19 in track 48 with the waste tape in track 44;

(39) now controller 130 causes valves 208 and 212 to apply vacuum to tracks 66 and 72 and cutter arm 112 is reciprocated so as to cut tape 19 at the second splicing block assembly;

(40) splicing block 60 is moved outward so that track 70 is aligned with track 66 and track 72 is even with track 68;

(41) splicer 10 is then operated to splice the leading end of tape 15 of the new #1 pancake 14 to the trailing end of the tape 19 from the #2 pancake residing in track 66;

(42) then the vacuum established in tracks 44, 48, 66 and 70 is turned off and servo motor 128 and waste motor 180 are then operated in the manner of operation (33) above so that the splice made by splicer 10 in tracks 70 and 66 is pulled through the gap between blocks 34 and 36;

(43) then the vacuum is reestablished in tracks 44 and 48, and cutter arm 111 is reciprocated so as to cut tape 15 at the first splicing block assembly;

(44) thereafter operations (2)–(43) are repeated so that a new series of cassettes is loaded.

The machine above described offers the obvious advantage that its productivity is interrupted only momentarily while its shifts from a depleted pancake to a full pancake, and even then the changeover does not require intervention by an operator. Also once a changeover has been made, the operator has sufficient time to replace the depleted pancake with a full one before another pancake changeover is required. A further advantage of the invention is that it may be practiced utilizing much of the technology previously used in machines of the type disclosed in said U.S. Pat. No. 3,997,123, with the result that operators familiar with prior machines may be rapidly trained to run new machines embodying the invention.

Still another advantage is that the machine may be made to load pre-recorded tape albums into C-O cassettes without any need to change the operation of the two splicing block assemblies. In this connection it is to be noted that a Q-tone pickup device of the type well known in the art of cassette loaders may be installed at any convenient location, e.g., at the location shown in FIG. 1 for the Q-tone pickup 55, in which case the controller 130 may be programmed to respond to the recorded Q-tone signal of an album, in order to cause the tape winding operation to stop and the so-called "cut, shift and splice" routine to be executed after the album has been loaded into the cassette. Regardless of whether the tape to be loaded is blank or pre-recorded, the controller can be programmed to keep count of the number of cassettes loaded so as to determine when a pancake of known amount of tape or known number of albums has been depleted to the point where it lacks sufficient tape to properly load another C-O cassette. Of course, other means of determining when a pancake has been depleted also may be used to enable the controller to conduct the pancake shifting operation at the proper time.

A further advantage is that the invention allows waste tape to be discarded automatically. This is particularly advantageous in loading cassettes with pre-recorded tape.

Still another advantage is that the present invention minimizes the manual threading required as each new pancake is added to the machine.

Obviously the invention may be embodied in cassette loading machines which utilize other types of tape splicers and cutters, other types of cassette storage magazines and feeders, other forms of splicing block assemblies, and other means for actuating or operating the various mechanisms. Thus, for example, electrical motors or solenoids may be used in place of the pneumatic actuators previously illustrated and described.

The invention may be practiced utilizing a sequence of operations that varies in certain respects from the sequence of operations described above. In this connection it is to be noted that some of the operations herein described may be accomplished at the same time as instead of after other operations. Thus, for example, when a new pancake is about to be used in the machine, the cutting operation at the splicing block assembly 6 may be initiated earlier in the cycle than is the case in the above described cycle of operations.

Still other advantages and possible modifications of the invention will be obvious to persons skilled in the art.

What is claimed is:

1. Apparatus for loading tape into C-O cassettes comprising:
   (a) first and second tape supply reel drives comprising first and second reel support means for supporting first and second reels of use tape to be loaded, and first and second drive means for rotating said first and second reel support means respectively in a first or second direction;
   (b) first and second splicing block assemblies;
   (c) said first splicing block assembly comprising a first splicing block having first and second tape guide means, a second splicing block having third and fourth tape guide means, means mounting said first splicing block for movement between first and second reference positions, means mounting said second splicing block for movement between third and fourth reference positions, and first and second shifting means for shifting said first and second splicing blocks respectively between said first and third reference positions and said second and fourth reference positions respectively, said first and second tape guide means being aligned with said third and fourth tape guide means respectively when said first and second splicing blocks are in said first and third reference positions or in said second and fourth reference positions respectively;
   (d) said second splicing block assembly comprising a third splicing block having fifth, sixth, and seventh tape guide means, a fourth splicing block having eighth and ninth tape guide means, means mounting said third splicing block so that it is fixed in a fifth reference position, means mounting said fourth splicing block for movement between sixth and seventh reference positions, and means for shifting said fourth splicing block between said sixth and seventh reference positions, said fifth and sixth tape guide means being disposed so as to be aligned with said eighth and ninth tape guide means when said fourth splicing block is in said sixth reference position and said sixth and seventh tape guide means being disposed so as to be aligned with said eighth and ninth tape guide means when said fourth splicing block is in said seventh reference position, said fifth and sixth tape guide means being disposed so that said fifth tape guide means is aligned with said first and third tape guide means and said sixth tape guide means is aligned with said second and fourth tape guide means when said first and second splicing blocks are in said first and third reference positions respectively, and said sixth and seventh tape guide means being disposed so that said sixth tape guide means is aligned with said first and third tape guide means and said seventh tape guide means is aligned with said second and fourth tape guide means when said first and second splicing blocks are in said second and fourth reference positions respectively;
   (e) plural tape cutter means comprising a first tape cutter for cutting tape extending across said first and second splicing blocks, a second cutter for cutting tape extending across said third and fourth splicing blocks respectively, and first and second cutter operating means for operating said first and second cutter means respectively on command;
   (f) a loading station comprising means for feeding cassettes to be loaded to a predetermined loading positon and means for supporting a cassette to be loaded in said predetermined loading position;
   (g) takeup means including a rotatable takeup shaft, third drive means for rotating said takeup shaft on command, and actuating means for moving said takeup shaft into or out of driving engagement with a hub of a cassette located at said loading station;
   (h) first and second splicers associated with said first and second splicing block assemblies respectively, each of said splicers comprising splicer operating means for cutting and applying a piece of adhesive splicing tape to the abutting ends of two tapes to be spliced supported by the associated splicing block assembly;
   (i) means for extracting the leader from a C-O cassette located in said loading position and placing said leader in said second and fourth tape guide means; and
   (j) means for sequentially controlling operation of said drive means, said shifting means, said cutter operating means, said splicer operating means, said leader extracting means, and said cassette feeding means so that as a first reel of use tape mounted on said first reel support means is about to be exhausted, (1) the use tape from said first reel is cut at said second splicing block assembly so as to form a trailing end, (2) that trailing end is automatically spliced at said second splicing block assembly to the leading end of a use tape provided by a second reel of tape mounted on said second tape reel support means, (3) the said leading end of the use tape from the second reel is pulled past the first splicing block, and (4) thereafter cassettes are loaded with the tape from said second reel.

2. Apparatus according to claim 1 wherein the cutting of the use tape from a reel of use tape supported by said first tape reel support means for splicing to use the tape provided by said second reel occurs after one C-O cassette has been loaded and discharged from said loading position and before a new C-O cassette is placed in said loading position.

3. Apparatus according to claim 1 wherein said fifth reference position is established by a flat plate to which said third splicing block is attached.

4. Apparatus according to claim 3 wherein said splicing blocks are disposed so that said tape guide means all extend parallel to said flat plate.

5. Apparatus according to claim 4 wherein said plate is located in a first plane, said splicers have tape applying means mounted for movement in a second parallel plane, and said sixth tape guide means is located in said second plane.

6. Apparatus according to claim 1 wherein said first and second splicers are located so as apply a section of splicing tape to a pair of tapes aligned with said sixth tape guide means.

7. A method of operating a machine for loading a use tape into C-O cassettes so as to automatically splice the trailing end of a first use tape, e.g., a magnetic recording tape, pulled off of a first tape supply reel to a leading end of a second use tape, e.g., a magnetic recording tape, pulled off of a second tape supply reel, whereby the machine can continue to load C-O cassettes with the second use tape while the depleted first supply reel is replaced with a third supply reel of use tape, comprising the steps of:

(a) providing the machine with a first splicing block assembly comprising a first splicing block having first and second tape guide means, a second splicing block having third and fourth tape guide means, and means for moving each splicing block on command between a first position and a second position, with said first tape guide means being located so as to be aligned with said third tape guide means when both of said first and second blocks are in said first or second positions and aligned with said fourth tape guide means when said first block is in its said first position and said second splicing block is in its said second position;

(b) providing the machine with a second splicing block assembly comprising a third splicing block having fifth, sixth and seventh tape guide means, a fourth splicing block having eighth and ninth tape guide means, means mounting said third splicing block so that its position is fixed, and means for moving said fourth splicing block on command between third and fourth positions, with said fifth and sixth tape guide means aligned with said eighth and ninth tape guide means respectively when said fourth block is in said third position, said sixth and seventh tape guide means are aligned with said eighth and ninth tape guide means respectively when said fourth block is in said fourth position, and said sixth tape guide means is aligned with said second and fourth tape tape guide means when said first and second blocks are in said first positions and aligned with said first and third tape guide means when said first and second blocks are in said second positions;

(c) shifting said first and second blocks to their said second positions and said fourth splicing block to its said fourth position;

(d) positioning the leading end of a first supply reel of use supply tape so that said use tape extends along said eighth, sixth, third and first tape guide means;

(e) positioning the leading end of a second supply reel of use supply tape so that said tape extends along said seventh and ninth tape guide means;

(f) positioning a C-O casette to be loaded in said loading position;

(g) shifting said first and second splicing blocks to their said first positions;

(h) extracting the leader from said C-O cassette and positioning it so that it extends along said second and fourth tape guide means;

(i) simultaneously cutting said first use tape and said extracted leader between said first and second splicing blocks so as to form a leading end of said first use tape supported by said second splicing block, a severed waste section of said first use tape overlying said first splicing block, and first and second leader sections overlying said first and second splicing blocks respectively;

(j) shifting said second splicing block so as to align said third tape guide means with said second tape guide means;

(k) splicing said leading end of said first use tape to said first leader section;

(l) winding said first leader section and a predetermined length of said first use tape into said first cassette and then terminating winding;

(m) severing said first use tape between said first and second splicing blocks so that said first use tape has a new leading end supported by said second splicing block and a new trailing end supported by said first splicing block;

(n) then shifting said second splicing block so as to align said fourth tape guide means with said second tape guide means;

(o) splicing said second leader section to the new trailing end of said first use tape supported by said first splicing block;

(p) winding said second leader section into said first cassette and removing said first cassette from said loading station;

(q) positioning a second cassette in said loading station and repeating steps (f) through (p) so that a predetermined amount of said first use tape is loaded into said second cassette and said second loaded cassette is discharged from the machine;

(r) continuing to repeat steps (f) through (p) until the supply of said first use tape is nearly exhausted;

(s) shifting said first and second splicing blocks to their said second positions;

(t) splicing said severed waste section of first use tape on said first splicing block to the leading end of the second use tape on the second splicing block;

(u) cutting said second use tape between said third and fourth splicing blocks so as to form a new leading end;

(v) shifting said fourth splicing block so that said ninth tape guide means is aligned with said sixth tape guide means;

(w) splicing said new leading end of said second use tape to the trailing end of said first use tape supported by said third splicing block;

(x) pulling said trailing end of said first use tape far enough to have the spliced leading end of said second use tape extend over onto the first tape guide means of said first splicing block;

(y) cutting said second use tape between said first and second splicing blocks;

(z) shifting said first and second splicing blocks to their said first positions;

(aa) positioning a new cassette in said loading position; and (ab) repeating steps (h) through (p) so as to load a plurality of C-O cassettes with said second use tape.

8. A method of operating a machine for loading C-O cassettes with a use tape so that a trailing end of a first use tape pulled off of a first tape supply reel is automatically spliced to a leading end of a second use tape pulled off of a second tape supply reel, whereby the machine can continue to load C-O cassettes with the second use tape while the depleted first supply reel is replaced with a third supply reel of use tape, comprising the steps of:

(a) severing said first use tape so that said first use tape has a leading end and a trailing end;

(b) splicing said first use tape leading end to the trailing end of a waste tape;

(c) pulling said first tape far enough so that said waste tape is displaced by said first tape at a selected location;

(d) cutting said first tape at said selected location as as to form a new leading end;

(e) loading said first use tape commencing with said new leading end thereof into a plurality of C-O cassettes so that said C-O cassettes are loaded one at a time;

(f) thereafter, as said first supply reel is nearly depleted, cutting said first use tape so as to form a new trailing end;

(g) splicing said new trailing end of said first use tape to the leading end of said second use tape; and (h) loading C-O cassettes one at a time with said second use tape.

9. A method according to claim 8 wherein after said new trailing end of said first use tape is spliced to the leading end of said second use tape, said first tape is pulled far enough for it to be displaced by said second use tape at said selected location, and then said second use tape is cut at said selected location so as to form a new leading end, and thereafter C-O cassettes are loaded one at a time with said second use tape.

10. A method of operating a machine for loading C-O cassettes with a use tape so that a first use tape from a first tape supply reel is automatically spliced to a second use tape from a second tape supply reel, whereby (a) when said first supply reel is depleted the machine can continue to load cassettes with use tape from said second supply reel and (b) during the time that said machine is loading cassettes with said second use tape, the depleted first supply reel can be replaced with another reel of use tape, said method comprising the steps of:

(a) splicing the leading end of a first use tape from a first supply reel to the trailing end of a waste tape at a first station;

(b) pulling said spliced waste tape and said first use tape far enough so that said waste tape is displaced by said first use tape at a second station located downstream of said first station;

(c) cutting said first use tape at said second station so as to form a new leading end for said first use tape and a new waste tape;

(d) loading said first use tape commencing with said leading end thereof into a plurality of cassettes so that said cassettes are loaded one at a time;

(e) when said first supply reel is nearly depleted, cutting said first use tape so as to form another new leading end at said second station;

(f) splicing said another new leading end to said new waste tape at said second location;

(g) cutting said first use tape at said first station so as to form a new trailing end;

(h) splicing said new trailing end to the leading end of a second use tape from a second supply reel;

(i) pulling said second use tape far enough so that said first use tape is displaced by said second use tape at said second station;

(j) cutting said second use tape at said second station so as to form a new leading end therefor and another waste tape; and (k) loading said second use tape commencing with said new leading end thereof into a plurality of cassettes so that said cassettes are loaded one at a time.

* * * * *

UNITED STATES PATENT AND TRADEMARK OFFICE
CERTIFICATE OF CORRECTION

PATENT NO. : 4,497,454
DATED : February 5, 1985
INVENTOR(S) : George M. Woodley

It is certified that error appears in the above-identified patent and that said Letters Patent is hereby corrected as shown below:

Claim 2, column 14, line 42, the words "use the" at the end of the line should read -- the use --.

Claim 6, column 14, line 59, the word "to" should be inserted after the word "as".

Claim 7, column 15, line 32, the word "tape" (second occurrence) should be deleted.

*Signed and Sealed this*

*Twenty-fifth* Day of *June 1985*

[SEAL]

*Attest:*

DONALD J. QUIGG

*Attesting Officer*  *Acting Commissioner of Patents and Trademarks*